Patented Dec. 1, 1953

2,661,341

UNITED STATES PATENT OFFICE 2,661,341

FIRE-RESISTANT RESINOUS PRODUCT AND PROCESS FOR PRODUCING SAME

Howard K. Nason and Morris L. Nielsen, Dayton, Ohio, assignors to Monsanto Chemical Company, St. Louis, Mo., a corporation of Delaware No Drawing. Application June 21, 1950, Serial No. 169,508

6 Claims. (Cl. 260—33)

This invention relates to new, resinous compositions of matter and to processes for producing the same. More specifically the invention relates to new, fire-resistant, resinous products which have no tendency to exhibit afterglow.

It is an object of the invention to provide resinous, phenolic compositions of matter which are flame-resistant, and in addition will not exhibit afterglow. The invention also provides a process for producing these compositions.

In accordance with the terminology which has developed in this field "fire-resistance" results from the treatment of a material so that it is resistant to the propagation of flame across its surface after the igniting flame has been removed; that is, a fire-resistant material will not support combustion independently of an external source of flame. In contact with an open flame, however, are at elevated temperatures, fire-resistant, organic products can be expected to char and decompose.

"Afterglow" refers to the persistence of a nonflaming combustion manifested as a red glow or incandescence which consumes the material after all flame has been extinguished.

It is an inherent property of those resins which do not contain nitrogen and which are composed substantially only of carbon, hydrogen and oxygen to be particularly susceptible to combustion of the glowing as well as flaming type. This is particularly true of the phenolic class of resins which materials have been found to glow excessively after they have been exposed to a flame. Such "glowing" combustion is particularly dangerous in coating or fiber binding compositions where an extended surface of large area is exposed to heat. This condition is met in structures, such as glass fiber mats which are used for air filtration or for heat insulation. It is also true of structures consisting of cellulosic or other fibrous material impregnated with phenolic resins.

The resinous materials which may be treated by the herein described process are those described by P. W. Powers, Synthetic Resins and Rubbers, chapter 3, pages 53–79 (Wiley, 1943).

The particular methods for producing the phenolic resins form no part of our present invention which is concerned solely with the process of rendering such resins flame- and glow-resistant by the incorporation therein of the final composition of a nitrogen- and phosphorus-containing product.

It has been found that the incorporation into a resinous, phenolic body of such an amount so as to comprise from 3% to 90% by weight of the final product, of the water-soluble, nitrogen- and phosphorus-containing product, described in copending application Serial No. 169,513, filed June 21, 1950, results in the production of a flame- and glow-resistant, phenolic, resinous composition. The copending application is assigned to the same assignee as is the present case.

According to the pending application, referred to above, the phosphorus- and nitrogen-containing products utilized in the present invention are produced by first reacting together phosphorus oxychloride and ammonia, preferably in an inert solvent. The product produced by this reaction is then heated to a temperature of at least 110° C., but not above 150° C. The above reaction also yields by-product ammonium chloride corresponding in amount to the chlorine present in the phosphorus oxychloride. For the present purpose the ammonium chloride should be largely removed. This is done by the extraction of the heat treated phosphorus oxychloride-ammonia reaction product by means of solvents. In general, the extraction is best carried out employing liquid anhydrous ammonia as the extracting solvent which dissolves the ammonium chloride, leaving the ammonia-insoluble, phosphorus-nitrogen compound as a white, non-hygroscopic solid.

The nitrogen-phosphorus product so produced has, when dissolved in aqueous solutions, a pH within the range of from 7.0 to 8.5, a molecular weight of from 180 to 300, a preferred range being from 200 to 250, and a nitrogen to phosphorus atomic ratio of from 2.1 to 2.3. The nitrogen to phosphorus ratio and the pH depend somewhat upon the temperature employed in the heating step. The so-formed nitrogen-phosphorus product is soluble not only in water but also in glycerine, ethylene glycol and formamide.

In carrying out the process of the invention to produce the present products, the preparation may suitably commence with the solution of phosphorus oxychloride in a solvent. The phosphorus oxychloride so dissolved in then reacted with ammonia in gaseous or liquid form with suitable agitation. The temperature should be maintained below 100° C. during the addition of the ammonia. However, after the addition of at least the stoichiometric proportion of ammonia (5 moles per mole of $POCl_3$) the temperature is raised and the product heated to at least 110° C., but not above 150° C. It has been found that the temperature control within the above limits is essential to prevent the formation of a water-insoluble product on the one hand, and on the other hand to alter the intermediate product so that the subsequent separation and purification steps can be carried out successfully. The reaction of phosphorus oxychloride with ammonia, followed by heating the reaction product to at least 110° C., but not above 150° C., yields the desired composition in a form insoluble in liquid anhydrous ammonia. Ammonium chloride is formed as a by-product by reaction of ammonia with the chlorine present in the phosphorus oxychloride. As a result of the conditions under which the present product is prepared, it has been found to be possible to form the nitrogen-phosphorus product so that it possesses solubility characteristics enabling the subsequent separation of the product from the ammonium chloride to be carried out by differential solubility methods. At the same time the desired product is obtained in a form which is highly reactive with cellulose.

Preferred solvents for carrying out the production of the initial condensation product of ammonia with phosphorus oxychloride are any inert liquid, such as kerosene, naphtha, hexane, benzene, acetone, or other organic liquids which do not react with ammonia or phosphorus oxychloride.

Phosphorus oxychloride to the amount of 90 pounds is dissolved in 90 gallons of hexane contained in an autoclave. The solution is heated to approximately 55° C. while stirring, and gaseous anhydrous ammonia is added thereto. Although an exothermic reaction takes place, the reaction may be carried out at about 75° C. by cooling the vessel. Ammonia to the extent of 50 pounds (5 moles per mole of phosphorus oxychloride) is added to the autoclave over a two hour period. An excess of ammonia may be used. After the addition of this amount of ammonia, the autoclave is sealed and then heated to about 130° C. for approximately 1½ hours. After the completion of the heating period, the reaction mixture is cooled to below 40° C. and then transferred to a second vessel containing a filter element and provided with external heating means. By applying heat to the autoclave contents the hexane present is distilled off, condensed and recovered. The remaining solids which consist of a mixture of the nitrogen- and phosphorus-containing product with ammonium chloride are then extracted under pressure with anhydrous ammonia at about room temperature. A total of about 20 pounds of ammonia per pound of final product is employed, although it is also possible to carry out an extraction with 10 pounds of ammonia per pound of product. The slurry of product in anhydrous liquid ammonia was filtered by means of a filtering device contained within the autoclave. In this manner, substantially all of the ammonium chloride is leached from the residual solids. After the last extraction the residual ammonia adhering to the product is removed by evaporation induced by the application of heat to the product. The yield of the nitrogen-phosphorus product obtained is approximately 85% of the theoretical. The product contains 33.8% nitrogen, 35.1% phosphorus, N/P ratio=2.14.

The present phenolic, resinous compositions may be utilized for the production of sheets of plastic materials or in the manufacture of formed, plastic articles of various types which may be produced by impregnating cellulosic materials by molding, extrusion, casting, or other processes.

The present compositions may be prepared by simply mixing the nitrogen-phosphorus-containing product with the phenolic resin. The phenolic resin or condensation product employed may be utilized in any stage of condensation; that is, it may be in water-solution in the liquid stage or in the solid heat-reactive stage. Likewise, the nitrogen-phosphorus product may be utilized in aqueous solution or it may be dissolved in any of the other non-aqueous solvents mentioned above. In whatever form in which the phenolic resin occurs, it may be readily mixed and combined with the aforesaid nitrogen-phosphorus-containing product. For the production of impregnated, fibrous materials which are produced by impregnation of fibrous sheets with warm solutions of heat-reactive, phenolic condensation products, the water-soluble, nitrogen-phosphorus reaction products may be added directly to such impregnated solutions.

It has been found that when the present products are subjected to a flame, a chemical reaction occurs in some manner greatly reducing the flammability of the resin and entirely eliminating any tendency to afterglow.

The following examples illustrate several embodiments of the present invention:

*Example 1*

A phenolic type condensation product was provided in the form of a water-solution of a resorcinol-formaldehyde resin. These resins are described in C. Ellis, Chemistry of Synthetic Resins, pages 371–373 (Reinhold Publishing Co., 1933). Seventy-five parts of the resinous material were mixed with 5 parts of the nitrogen-phosphorus product and 20 parts of a basic condensation catalyst. The liquid resin was applied to cloth strips and allowed to dry in the open air. The treated fabric was then cured in an oven at 150° C. for 30 minutes for the purpose of further condensing the resin.

In order to determine the degree of adherence of the resinous composition to the fabric the above samples were leached in water for 24 hours. Control samples as well as uncured samples containing the above formulation without the curing step were also subjected to such water extraction. After the leaching tests the samples were dried and were then subjected to the standard flameproofing tests. These tests are described by R. W. Little in Flameproofing Textile Fabrics, pages 111–115 (Reinhold Publishing Co., 1947). It was found that the treated materials did not burn or exhibit any afterglow in contrast to the control samples which burned readily. There was no noticeable difference in the leached and unleached samples showing that the composition resists washing and exposure to weather.

*Example 2*

A formulation similar to that of Example 1 employing the water-soluble, resorcinol-formaldehyde condensation product together with 10% by weight of the nitrogen- and phosphorus-containing product and also an alkaline catalyst was applied to mats of glass wool in order to form air filters and insulating structures. The resin was applied by immersing the mats in the resin solution and then removing the excess of liquid resin by suction. The treated glass forms were then cured at 130° C. for one-half hour.

For comparison purposes similar mats were formed from resorcinol-formaldehyde applied in approximately the same composition but without the presence of the nitrogen- and phosphorus-containing product.

The treated glass wool air filters were subjected to a combustion test employing an oxygen-gas torch provided with a direct oxygen line such as is employed in cutting metals by means of a torch. The mats were ignited by means of the torch and held in the flame for 5 seconds, after which the gas was shut off and the oxygen stream under pressure was directed onto the ignited spot. It was found that the mat formed from the resorcinol-formaldehyde condensation product alone continued to glow and to undergo combustion under the above conditions, whereas the mat treated with the nitrogen-phosphorus-containing resorcinol-formaldehyde condensation product exhibited no afterglow, but instead extinguished itself even when subjected to the stream of oxygen directed upon the hot portion of the filter.

The above compositions may be formed from phenolaldehyde resins generally, as described in the Ellis and Powers references, mentioned above.

The treated materials may be molded or formed into any desired shape to give resinous products which do not burn and which do not exhibit afterglow.

Combinations of the phenol-formaldehyde condensation products together with the nitrogen-phosphorus-containing product are particularly useful in the art of coating and bonding glass fibers together in the form of mats. Such treated glass fiber mats are useful as air filters or for heat insulation purposes, since they do not burn and will not glow after exposure to a flame. Other siliceous materials, particularly when in attenuated form, such as fibrous silica, asbestos, mineral wool and cellular or fibrous glass may also be bonded giving a glow-resistant product.

Having now described certain specific embodiments of the invention, it is to be understood that the invention is not to be limited to the specific forms of composition herein described or specifically covered by the claims.

What is claimed and is desired to be protected by Letters Patent of the United States is:

1. A composition which resists afterglow comprising in combination a phenol-aldehyde resin and a water-soluble reaction product of one mole of phosphorus oxychloride with at least five moles of anhydrous ammonia, at a temperature of at least 110° C. but below 150° C., said reaction product having a pH of from 7.0 to 8.5, a molecular weight of from 180 to 300, and a nitrogen to phosphorus ratio of from 2.1 to 2.3 and said reaction product being present to the extent of from 3% to 90% by weight of said composition.

2. A composition which resists afterglow comprising in combination a phenol-aldehyde resin and a water-soluble reaction product of one mole of phosphorus oxychloride with at least five moles of anhydrous ammonia, at a temperature of at least 110° C. but below 150° C., said reaction product having a pH of from 7.0 to 8.5, a molecular weight of from 180 to 300, and a nitrogen to phosphorus ratio of from 2.1 to 2.3.

3. A composition which resists afterglow comprising in combination a resorcinol-formaldehyde resin and a water-soluble reaction product of one mole of phosphorus oxychloride with at least five moles of anhydrous ammonia, at a temperature of at least 110° C. but below 150° C., said reaction product having a pH of from 7.0 to 8.5, a molecular weight of from 180 to 300, and a nitrogen to phosphorus ratio of from 2.1 to 2.3.

4. The method of producing a glow-resistant, non-combustible material which comprises applying to the said material a dispersion of a phenol-aldehyde resin in combination with a water-soluble reaction product of one mole of phosphorus oxychloride with at least five moles of anhydrous ammonia, at a temperature of at least 110° C. but below 150° C., said reaction product having a pH of from 7.0 to 8.5, a molecular weight of from 180 to 300, and a nitrogen to phosphorus ratio of from 2.1 to 2.3, and thereafter curing the material by heating.

5. An insulating material comprising a glass fiber mat rendered glow-resistant by the application thereon of a phenol-aldehyde resin in combination with a water-soluble reaction product of one mole of phosphorus oxychloride with at least five moles of anhydrous ammonia, at a temperature of at least 110° C. but below 150° C., said reaction product having a pH of from 7.0 to 8.5, a molecular weight of from 180 to 300, and a nitrogen to phosphorus ratio of from 2.1 to 2.3.

6. As an article of manufacture, a mat of glass fiber, and as a binder therefor a resorcinol-formaldehyde resin in combination with a water-soluble reaction product of one mole of phosphorus oxychloride with at least five moles of anhydrous ammonia, at a temperature of at least 110° C. but below 150° C., said reaction product having a pH of from 7.0 to 8.5, a molecular weight of from 180 to 300, and a nitrogen to phosphorus ratio of from 2.1 to 2.3.

HOWARD K. NASON.
MORRIS L. NIELSEN.

References Cited in the file of this patent

UNITED STATES PATENTS

| Number | Name | Date |
| --- | --- | --- |
| 2,052,886 | Leroy | Sept. 1, 1936 |
| 2,163,085 | Cupery | June 20, 1939 |
| 2,335,102 | Bergin et al. | Nov. 23, 1943 |
| 2,413,163 | Bacon | Dec. 24, 1946 |
| 2,582,181 | Truhlar et al. | Jan. 8, 1952 |